May 12, 1959  J. W. LOCHMILLER  2,886,038
DE-BEAKING DEVICES
Filed May 11, 1956  4 Sheets-Sheet 1
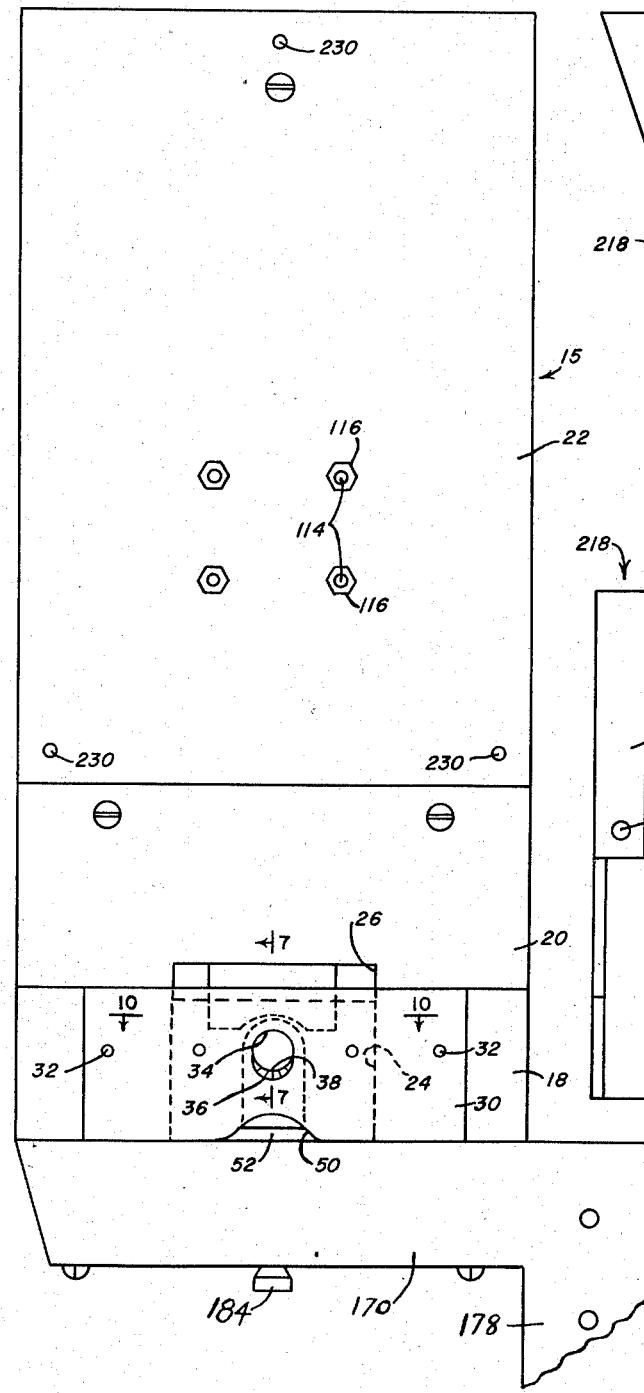
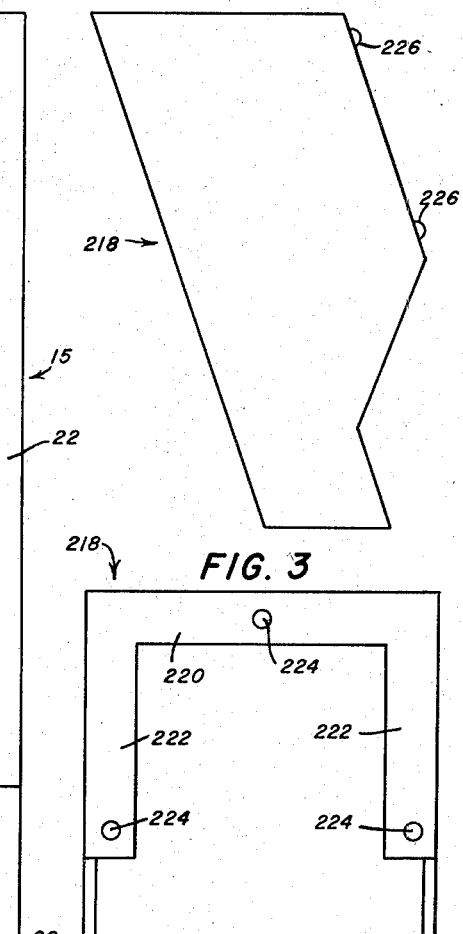
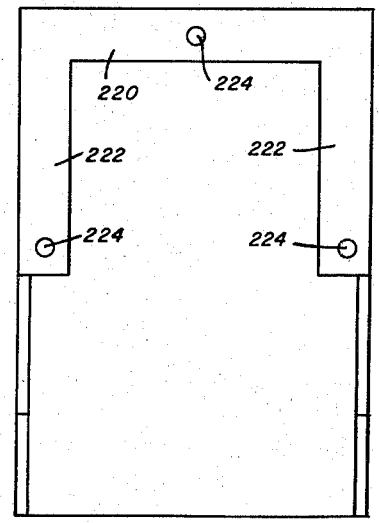
INVENTOR.
JESSE W. LOCHMILLER
BY
ATTORNEY.

May 12, 1959 J. W. LOCHMILLER 2,886,038
DE-BEAKING DEVICES

Filed May 11, 1956 4 Sheets-Sheet 2

INVENTOR.
JESSE W. LOCHMILLER
BY
ATTORNEY.

May 12, 1959 J. W. LOCHMILLER 2,886,038
DE-BEAKING DEVICES

Filed May 11, 1956 4 Sheets-Sheet 3

INVENTOR.
JESSE W. LOCHMILLER
BY
ATTORNEY

May 12, 1959  J. W. LOCHMILLER  2,886,038
DE-BEAKING DEVICES
Filed May 11, 1956  4 Sheets-Sheet 4
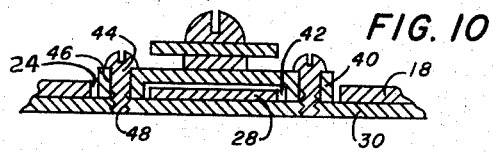
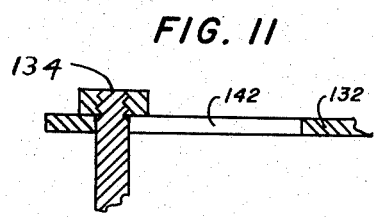
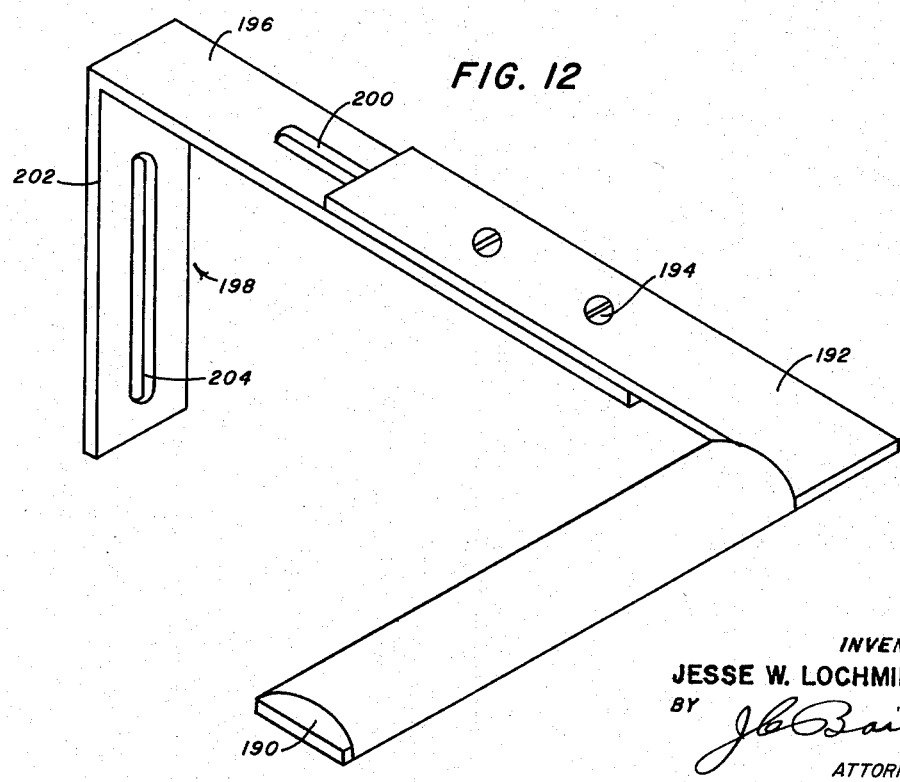
INVENTOR.
JESSE W. LOCHMILLER
BY
ATTORNEY.

United States Patent Office 2,886,038
Patented May 12, 1959

2,886,038

DE-BEAKING DEVICES

Jesse W. Lochmiller, Whittier, Calif.

Application May 11, 1956, Serial No. 584,202

12 Claims. (Cl. 128—305)

This invention relates to means for de-beaking or trimming the beaks of poultry.

As is well known, poultry, even the young birds, will often attack each other and engage in cannibalism, particularly when confined in relatively close quarters or when large numbers are confined under relatively crowded conditions as in hatcheries or the like. It has been found that by trimming the beaks, particularly the upper jaw, this trouble is overcome. Moreover, the birds do not scatter and waste feed as usually occurs when they have their full beaks. Other advantages are also secured by de-beaking the birds.

It is therefore an object of the present invention to provide an improved and novel de-beaking device or means for trimming the beaks of poultry.

Another object of the invention is to provide means of this character with which very high rate of debeaking may be effected.

Still another object of the invention is to provide means of this character that is automatic in its operation.

A further object of the invention is to provide means of this character that is electrically actuated.

A still further object of the invention is to provide means of this character having a very sensitive electric switch positioned to be actuated by being contracted and actuated by the bird's beak when properly positioned for cutting or trimming said beak.

Another object of the invention is to provide means or mechanism of this character wherein the switch has an actuating arm so positioned behind the cutting blade as to serve as a stop or gauge limiting the distance the beak is inserted with respect to the cutting blades to thereby determine the amount of the beak which will be cut off.

A still further object of the invention is to provide means of this character having means for adjusting the position of said switch actuating arm to selectively vary the amount of the beak which will be cut off.

A further object of the invention is to provide means or mechanism of this character so constructed and arranged that the beaks of the birds may be inserted between the cutter by natural movement of the hand of the operator.

A still further object of the invention is to provide means of this character having an arm rest which will provide a support of the operator's arm with the operator's hand positioned for holding the bird and placing the beak into cutting position and removing same therefrom with a minimum of effort and hand movement.

Another object of the invention is to provide means of this character that is simple and sturdy in construction.

Still another object of the invention is to provide means of this character that is reliable in operation.

A further object of the invention is to provide means of this character that is relatively inexpensive to manufacture.

The characteristics and advantages of the invention are further sufficiently referred to in connection with the following detailed description of the accompanying drawings which represent one successful embodiment. After considering this example, skilled persons will understand that many variations may be made without departing from the principles disclosed, and I contemplate the employment of any structures, arrangements or modes of operation that are properly within the scope of the appended claims.

Referring to the drawings:

Fig. 1 is a front elevation of a de-beaking mechanism embodying the present invention;

Fig. 2 is a reduced, side view of the back cover of the device;

Fig. 3 is a reduced front elevation of said cover;

Fig. 10 is an enlarged sectional view taken on line 10—10 of Fig. 1;

Fig. 11 is a fragmentary section taken on line 11—11 of Fig. 8; and

Fig. 12 is a perspective view of the arm rest and bracket for securing same to the mechanism.

Figure 4:
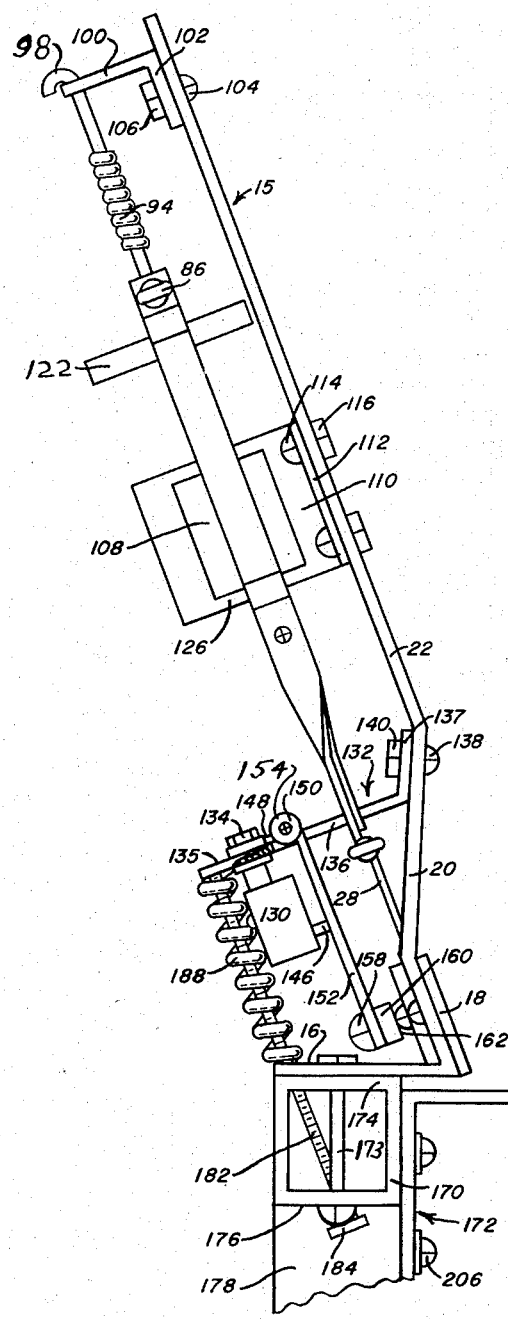
Fig. 4 is a side view of the mechanism.
Figure 5:
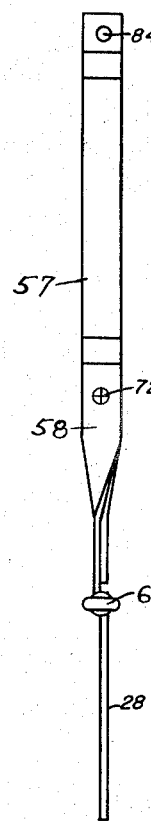
Fig. 5 is a side view of the cutter and solenoid armature carrying said cutter.
Figure 6:
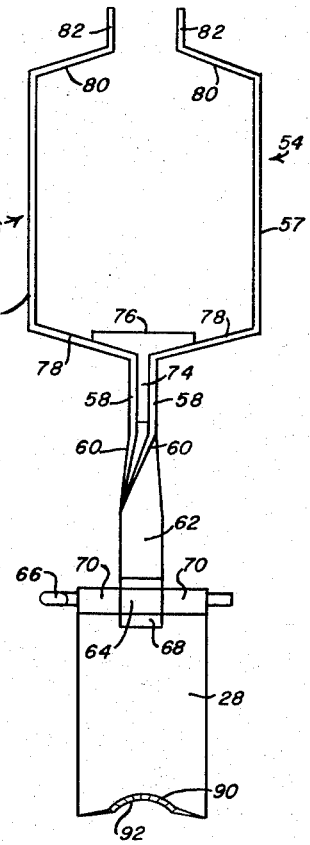
Fig. 6 is a front elevation of same.
Figure 7:
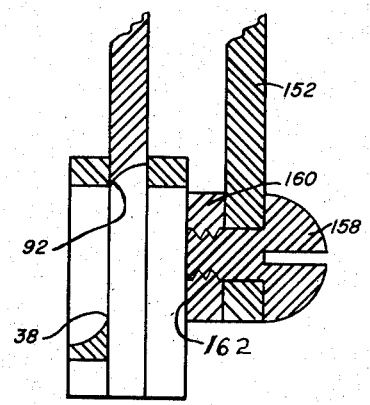
Fig. 7 is an enlarged, fragmentary section taken on line 7—7 of Fig. 1.

Referring more particular to the drawings, the apparatus comprises a mechanism supporting body or plate, indicated generally at 15, including a horizontal base 16 and successively upward from the front edge of which there is an upwardly and rearwardly inclined part 18, a vertical part 20, and a rearwardly inclined part 22 substantially longer than the other parts and in a plane parallel to the plane of the part 18.

The part 18 is provided with a relatively wide notch 24 intermediate the ends thereof, extending from the bottom of said part up into the lower portion at 26 of the vertical part 20 to provide clearance for the movable cutting blade 28 described more particularly hereinafter.

Across the front of the part 18 is a stationary cutting blade plate 30 removably secured to said part 18 by screws 32 passing through openings provided therefor in said part 18 and threadably received in tapped openings aligned with the first mentioned openings. Midway of the ends of said blade plate is an opening 34 of sufficient size as to permit ready insertion of the beak of a bird so that said beak may be trimmed or cut. The lower portion of said opening 34 is beveled at the outer side thereby providing an upwardly facing crescent shaped portion 36 to provide an arcuate shaped cutting edge 38 at the plane of the back side of said plate 30. Within the notch 24 is a blade guide member 40 having a recess 42 in the front face for slidable reception of said blade 28, said member 40 being secured to said blade plate 30 by screws 44 slidably received in openings 46 provided therefor in said guide member 40 in the side portions of said guide member at the sides of said recess 42, said screws being threaded into tapped openings 48 provided in said blade plate 30 in alignment with the openings 46. A notch 50 in the lower edge portion of the blade plate beneath the opening 34 and an opening or notch 52 in the base 16 in alignment with said opening 50 provides an opening means through which the cut off portion of the beaks drop and may be caught in a receptacle therefor, not shown.

Blade 28 is pivotally attached, at its upper end to the lower end of a blade carrying frame said frame comprising members 54 and 56 of strips of metal, each frame member comprising a relatively wide U-shaped part 57 having a depending lower end portion 58 twisted at 60 and ending in a portion 62 in a plane at right angles to the portion 58. Member 54 has an extended part which is turned to form a tubular portion 64 for reception of a cotter pin 66. Blade 28 is provided with a notch 68 in the upper end intermediate the sides thereof and the ears at the sides of said notch are turned to provide tubular portions 70 for reception of said cotter pin, the portion 64 of the frame member 54 thereby providing a pivotal connection between said blade and said frame. The frame members are secured together by means of a rivet 72 in aligned opening provided therefor in the twisted part 60, the U-shaped parts 57 being in opposed relationship to each other with the open ends of said parts 57 facing each other. Portions 58 are spaced apart and receive in the space therebetween the vertical part 74 of a T-shaped resilient bumper of rubber or other suitable material through which said rivet 72 passes, the cross piece 76 thereof being disposed on the lower arms 78 of the U-shaped parts 57 to serve as a resilient stop as more particularly described hereinafter. At the free ends of the arms 80 of the U-shaped parts 57 are upturned frame end portions 82 having aligned openings 84 therein for reception of a cotter pin 86 or the like.

The lower end of the movable blade 28 is provided with an arcuate rearwardly tapered notch 90 to provide a sharp arcuate cutting edge 92 which cooperates with the cutting edge 38 of the stationary blade, said movable blade 28 sliding upwardly and downwardly in the recess 42 of the blade guide 40. The movable blade 28 is urged upwardly by a spring 94 having the lower end 96 hooked to the cotter pin 86 and the opposite end 98 hooked through an opening provided therefor adjacent the free end of a rearwardly extending arm 100 of a bracket at the back side of the part 22 of plate 15, there being an arm 102 of said bracket extending downwardly of the opposite end of arm 100 and having an opening therein aligned with an opening in said part 22 adjacent the upper end thereof for reception of a screw 104 having a nut 106 whereby said bracket is secured to said plate part 22.

Means is provided for actuating the movable blade downwardly to effect the required cutting of a beak placed between the cutting edge 38 of the stationary blade and the cutting edge 92 of said movable blade, said means comprising a solenoid of well known character having a hollow coil 108 within a frame of laminated soft iron. The frame is of generally U-shape with vertical sides 110, at the upper ends of which are short inturned parts having their free ends spaced apart to provide an opening aligned with the central opening through the coil 108. Bridging strips, not shown, but of the usual well known character are secured at the sides of the inturned parts and the outer laminations of one arm of the frame are turned outwardly to provide attaching flanges 112. There are openings through said flanges which are aligned with openings in the part 22 for reception of securing screws 114 having nuts 116 provided therefor. Slidable in the core is laminated armature 120 having oppositely extending arms 122 which extend over the upper ends of the arms 110 of the solenoid frame. At the upper end of the armature the side laminations 124 extend upwardly beyond the arms 122 and are provided with openings in which the cotter pin 86 is received, thereby securing the armature in the blade carrying frame. It is to be noted that the opening defined by the U-shaped parts 57 of the blade carrying frame provide space to accommodate the solenoid and said space is sufficiently long to permit operative movements of said frame. Downward movement of the blade carrying frame is effected when the solenoid coil 108 is energized, such energization of the coil causing the armature 120 to be drawn downwardly into the coil in the known manner against the yielding resistance of spring 94, and the arms 122 to be also drawn downwardly by the magnetic force in the solenoid coil frame. Downward movement of the armature is limited by engagement of the arms 122 with the upper ends of the arms 110 of said solenoid frame. Return, upward movement effected by spring 94 is limited by the engagement of the cross part 76 of the resilient bumper with the lower end 126 of said U-shaped solenoid frame. When the armature is at the upper limit of movement the lower edge of the movable blade 28 is disposed above the opening 34, as clearly shown in Fig. 1, and when the armature is at the lower limit of movement the lower edge of said movable blade is below said opening sufficient distance so that the cutting edge 90 of said blade 28 is below the cutting edge 38 of the stationary blade to thereby effect proper cutting action.

There is means provided for controlling the current to the solenoid coil 108 and effect automatic operation of the mechanism, said means including a micro-switch 130 of well known character attached to a bracket 132 by means of screws 134. Bracket 132 is inclined downwardly and rearwardly normal to the plane of the part 20 and includes a plate 135 from which arms 136 extend forwardly and terminate in ears 137 adjacent the ends thereof which are turned upwardly at an obtuse angle for attachment to the part 20 of the plate 15, said ears having openings therein which register with openings in the part 20 for reception of attaching screws 138 having nuts 140 thereon. The bracket 132 has laterally extending slots 142, Fig. 11, in which said screws 134 are received so that the switch 132 may be adjusted toward and away from the plate 15.

Means for actuating the micro-switch plunger 146 comprises a hinge member 148 secured to the bracket 132 by any suitable means such as brazing or the like, the forward end of the hinge member 148 extending forwardly of the forward edge of the bracket plate 135 and being turned to removably receive a hinge pin 150. An arm 152 is provided with a notch in the upper end thereof to leave ears 154 at the upper corners, said ears being formed to operably receive the hinge pin 150 so that the arm will swing from its upper end. Normally the switch member or plunger 146 is spring urged to the fully outwardly extended position with the arm 152 abutting against the free end thereof, as best shown in Fig. 4. At the lower, free end of the arm there is an opening in which is received a screw 158 having a nut 160 at the front side of said arm, the end of the screw and the outer face of said nut being flush to present a flat or plane surface 162 which is disposed behind the opening 34 for engagement by the bird's beak or jaw to be trimmed. These parts providing said surface may be termed a beak contact member.

Figure 9:
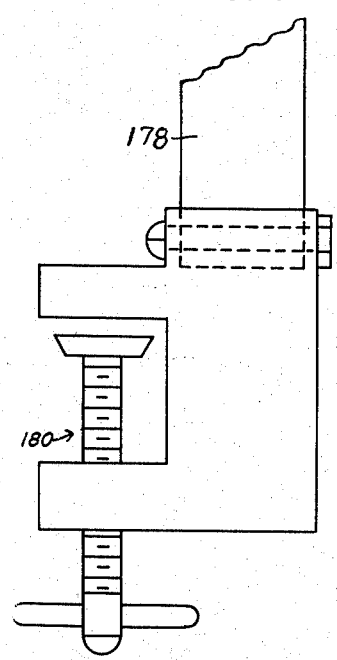
Fig. 9 is an enlarged fragmentary view of the clamp means for securing the mechanism to a suitable support.
Figure 8:
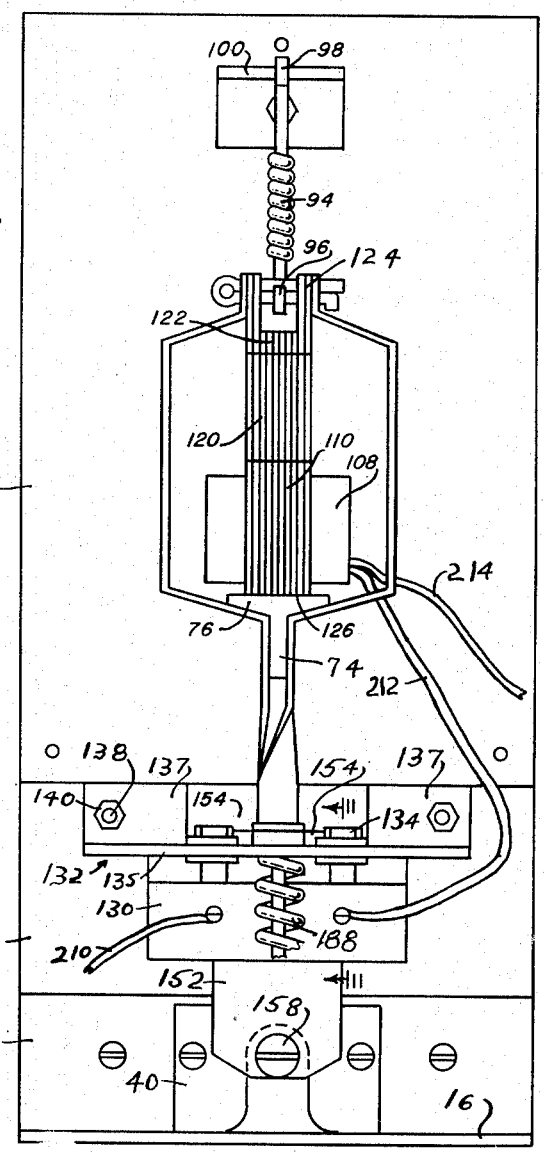
Fig. 8 is a rear view of the mechanism.

The base 16 of plate 15 is secured to a horizontal member 170 of a frame, indicated generally at 172. The frame member 170 may be of any suitable cross sectional shape but is shown, by way of example, as being square in said cross section and said base 16 is secured to said member 170 by means of screw 173 received in openings provided therefor in said base and the upper and lower sides 174 and 176 respectively of said frame member. Besides said member 170, the frame 172 includes an upright member 178 to the upper end of which said member 170 is secured. The lower end of said upright member 178 is provided with any suitable means for securing same to a support such as a table top, such securing means being shown as a clamp 180, Fig. 9, although it may be merely a base plate or the like.

Fine adjustment of the beak contact member is effected by means of a screw 182 having the upper end thereof secured to the plate 135 of the bracket 132. This screw extends downwardly and is loosely received in openings provided therefor in the upper and lower walls 174 and 176 of the support member 170. A nut 184 is provided on the lower end of said screw 182 and is engageable with the wall 176 for effecting longitudinal movement of said screw as said nut is turned. A spring 188 is disposed on the screw and reacts between the upper surface of the base 16 and the plate 135 for urging the latter upwardly. The material of the bracket 132 is resilient so that the free end of said bracket may be pulled downwardly by suitable turning of the nut 184 thus swinging the free end of the arm 152 toward the cutting blades and opening 34. Reverse turning of the nut 184 will permit the free end of said bracket 132 to move upwardly, aided by the force of spring 188, to cause the free end of said arm 150 to be moved away from said opening 34 and cutting blades.

An arm rest is also provided and includes an arm support member 190 which is padded, said arm member being in forwardly spaced relation to the plate 15 and having a part 192 which is at right angles to the support member and secured by screws 194 to a forwardly extending arm 196 of a bracket 198, the latter having a longitudinally extending slot 200 in which said screws 194 are received so that the arm support member 190 may be adjusted toward and away from the plate 15. Bracket 198 also has a vertical member 202 having a longitudinal slot 204 therein for reception of screws 206 used to secure the bracket to the frame member 178, vertical adjustment of the bracket and hence the arm support member 190 being thus provided.

The arm support member is adjusted to suit the operator and the axis of the opening 34 is inclined forwardly and upwardly so that the beak or jaw of a bird may be readily inserted into said opening 34 with a natural movement of the operator's arm and wrist, thereby increasing the rate of de-breaking and reducing to a minimum fatigue of the operator. The beak or jaw to be trimmed or cut off is inserted in said opening 34 and pressed against the beak contact member to move same rearwardly and thus effect closing of the switch 130 which is connected into the electric circuit to the solenoid coil 108 including wires 210 and 212, from a suitable source of electric current, the other wire to said coil being indicated at 214. Upon closing of said switch 130 the coil 108 is energized and the armature 120 pulled downwardly. This in turn moves the blade supporting frame downwardly so that the movable blade 28 snaps down and, in cooperation with the fixed blade, severs said beak or jaw. By adjusting the position of the beak contact member with respect to the cutting blades a desired, selected length of the beak or jaw is removed.

A suitable cover may be provided for the mechanism and comprises a box 218 of sheet metal or the like. The forward part of said box is open and inturned flanges 220, and 222 are provided along the top and upper portions of the sides. These flanges having openings 224 for reception of screws 226 which are threadably received in tapped openings 230 provided therefor in the part 20.

It is thought that the invention and many of its attendant advantages will be understood from the foregoing description and it is thought that it will be apparent that various changes may be made in the form, construction and arrangement of the parts of the invention without departing from the spirit and scope thereof or sacrificing all of its material advantages, the form hereinbefore described being merely by way of one successful embodiment.

I claim:

1. A de-beaker, comprising: mechanism support means including a plate having a generally horizontal base, and successively, upwardly and rearwardly inclined part, a substantially vertical part, and a second upwardly and rearwardly extending part in a plane substantially parallel to the first mentioned upwardly and rearwardly extending part, the first mentioned part having a notch which extends into the lower portion of the second mentioned part, and the base having a notch in the forward edge portion thereof; a stationary blade plate having an opening therein with an arcuately shaped, upwardly facing sharp cutting edge at the inner face of said plate, said plate being secured to the first mentioned part with the opening therein generally centrally located with respect to said notch; a blade guide secured to the back of said plate within said notch and having a vertical recess; a movable blade disposed in said recess and slidable vertically therein, said blade having an arcuate notch in the lower edge portion with an arcuate cutting edge curved oppositely of the cutting edge of the first blade part and cooperable therewith; means for actuating said movable blade, said means comprising a solenoid having a solenoid coil, an armature operably associated with said coil and adapted to move upwardly and downwardly in a plane substantially parallel to the second mentioned upwardly and rearwardly inclined part, means connecting said armature with said movable blade, said means comprising a frame having parts which straddle said coil and permit operable movement of said frame, said frame having a depending portion, means pivotally connecting the movable blade to said depending portion of said frame; spring means urging said frame upwardly; resilient bumper means secured to said frame for engagement with the lower end of the solenoid to limit upward movement of said frame, the movable blade being in its upper position when said bumper is in engagement with said solenoid and said blade being moved downwardly against the force of said spring to effect operable cutting action upon energization of said solenoid, said armature having arms engageable with the upper end of said solenoid to limit downward movement thereof; means for connecting the solenoid coil to a source of electrical current, a micro-switch in said connecting means for controlling the current to said solenoid coil, said micro-switch having a plunger movable to open and close said switch, a bracket secured to the back of the vertical part of the first mentioned plate, said micro-switch being secured to said bracket with the plunger facing forwardly, an actuating arm for said micro-switch, means providing a pivotal connection between the upper end of said arm and the micro-switch supporting bracket, said arm extending downwardly and engaging the free end of the plunger of the micro-switch, and beak engaging means at the lower end of said arm, said beak engaging means being positioned behind the opening in the fixed cutter blade plate; means for adjusting said arm toward and away from the cutter blades; a supporting frame for said mechanism supporting means adjustably moving the free end of the micro-switch supporting bracket in generally upwardly and downwardly direction; and an arm rest attached to said supporting frame in forwardly spaced relationship to the first mentioned plate; and means for vertically and horizontally adjusting the position of said arm rest.

2. A de-beaker, comprising: mechanism support means including a plate having a generally horizontal base, and successively, an upwardly and rearwardly inclined part, a substantially vertical part, and a second upwardly and rearwardly extending part in a plane substantially parallel to the first mentioned upwardly and rearwardly extending part, the first mentioned part having a notch which extends into the lower portion of the second mentioned part, and the base having a notch in the forward edge portion thereof; a stationary blade plate having an opening therein with an arcuately shaped, upwardly facing sharp cutting edge at the inner face of said plate, said plate being secured to the first mentioned part with the opening therein generally centrally located with respect to the notch; a blade guide secured to the back of said plate within said notch and having a vertical recess; a movable blade disposed in said recess and slidable vertically therein, said blade having an arcuate notch in the lower edge portion with an arcuate cutting edge curved oppositely of the cutting edge of the first blade part; means for actuating said movable blade, said means comprising a solenoid having a solenoid coil, an armature operably associated with said coil; a frame connected to said armature; means pivotally connecting the movable blade to the lower portion of said frame; spring means urging said frame, armature and blade upwardly; resilient bumper means for limiting upward movement of said frame, armature and blade, said blade being movable downwardly to effect operable cutting action upon energization of said solenoid; means limiting downward movement of said frame, armature and movable blade; means for connecting the solenoid to a source of electric current, said means comprising a micro-switch having a plunger movable to actuate said switch; mounting means for said micro-switch; an actuating arm for said micro-switch, means pivotally mounting the upper end of said arm to a support, said arm engaging the free end of the plunger of the micro-switch for operating same; beak engaging means at the lower end of said arm, said beak engaging means being positioned behind the opening in the fixed cutter blade plate for engagement by a bird's beak inserted in said opening whereby said arm is actuated to effect closing of said micro-switch; and an arm rest having means supporting same in forwardly spaced relationship to the first mentioned plate, and means for vertically and horizontally adjusting the position of said arm rest.

3. A de-beaker, comprising: mechanism support means including a plate having a generally horizontal base, and successively, an upwardly and rearwardly inclined part, a substantially vertical part, and a second upwardly and rearwardly extending part in a plane substantially parallel to the first mentioned upwardly and rearwardly extending part, the first mentioned part having a notch which extends into the lower portion of the second mentioned part, and the base having a notch in the forward edge portion thereof; a stationary blade plate having an opening therein with an arcuately shaped, upwardly facing sharp cutting edge at the inner face of said plate, said plate being secured to the first mentioned part with the opening therein generally centrally located with respect to the notch; a blade guide secured to the back of said plate within said notch and having a vertical recess; a movable blade disposed in said recess and slidable vertically therein, said blade having an arcuate notch in the lower edge portion with an arcuate cutting edge curved oppositely of the cutting edge of the first blade part; means for actuating said movable blade, said means comprising a solenoid having a solenoid coil, an armature operably associated with said coil; a frame connected to said armature; means pivotally connecting the movable blade to the lower portion of said frame; spring means urging said frame, armature and blade upwardly; resilient bumper means for limiting upward movement of said frame, armature and blade, said blade being movable downwardly to effect operable cutting action upon energization of said solenoid; means limiting downward movement of said frame, armature and movable blade; means for connecting the solenoid to a source of electric current, said means comprising a micro-switch having a plunger movable to actuate said switch; mounting means for said micro-switch; an actuating arm for said micro-switch, means pivotally mounting the upper end of said arm to a support, said arm engaging the free end of the plunger of the micro-switch for operating same; and beak engaging means at the lower end of said arm, said beak engaging means being positioned behind the opening in the fixed cutter blade plate for engagement by a bird's beak inserted in said opening whereby said arm is actuated to effect closing of said micro-switch.

4. A de-beaker, comprising: mechanism support means including a plate having a generally horizontal base, and successively, an upwardly and rearwardly inclined part, a substantially vertical part, and a second upwardly and rearwardly extending part, the first mentioned part having a notch which extends into the lower portion of the second mentioned part; a stationary blade plate secured to the first mentioned part of said first mentioned plate and having an opening therein with an arcuate, upwardly facing sharp cutting edge at the inner face of said plate, a blade guide secured to the back of said blade plate; a movable blade slidably disposed in said guide, said blade having an arcuate cutting edge in the lower edge portion, said cutting edge being curved oppositely of the cutting edge of the first blade part; means for actuating said movable blade, comprising a solenoid having a solenoid coil, and armature operably associated with said coil, and connecting means connecting said armature with said movable blade, said connecting means being pivotally connected with the movable blade, energization of said solenoid causing said armature to actuate said movable blade to effect cutting movement; means limiting movement of said blade in the cutting direction, means urging said blade in the opposite direction, means limiting movement of said blade in said opposite direction; means for controlling electric current to said solenoid coil, including a micro-switch; means attaching said switch to a fixed support; a pivotally mounted switch actuating arm; and beak engaging means at the free end of said arm, said beak engaging means being positioned behind the opening in the fixed cutter blade plate.

5. The invention defined by claim 4 wherein the means for mounting the micro-switch to a fixed support includes a resilient bracket having one end secured to said fixed support, means whereby said micro-switch and arm may be moved toward and away from the cutter blades; and means for adjustably flexing the free end of the micro-switch supporting bracket to effect movement of the beak engaging means toward and away from said blades.

6. In a de-beaker: a fixed blade plate having an opening therein with a sharp cutting edge defining a lower portion of said opening; a movable blade having an arcuate notch in the lower edge thereof with a sharp cutting edge defining said notch, the cutting edges of said fixed and movable blades being in opposed relationship to each other and in operable cutting relationship, guide means for guiding the movable blade upwardly and downwardly in cutting relationship to the fixed blade; electrical means for actuating said movable blade, said electrical means comprising a solenoid having a solenoid coil and an armature, means pivotally connecting said movable blade to said armature; yielding means urging the movable blade into an upper position, means limiting movement of said blade in said direction; energization of said solenoid coil being adapted to actuate the armature and hence the movable blade downwardly to effect cutting action in connection with the fixed blade; means limiting the downward movement of said armature and blade; switch means for controlling electrical energy to said solenoid coil, said switch means comprising a micro-switch having a plunger, means for supporting said micro-switch with the plunger facing in the direction of the blade; a switch actuating arm, means pivotally mounting the upper end of said arm with said arm in contact with said plunger so that rearward movement of said arm will close said micro-switch being adapted to normally urge the plunger outwardly; a beak engaging member adjacent the lower end of said arm and directly behind the opening in said fixed blade plate so that a bird's beak will engage said beak engaging means when said beak is passed through said opening; means for adjusting said beak engaging means toward and away from said opening; frame means for supporting the mechanism; and arm rest means disposed in spaced relation to the blade and forwardly thereof; and means for adjusting said arm rest means vertically and horizontally.

7. In a de-beaker: a fixed blade plate having an opening therein with a sharp cutting edge defining a lower portion of said opening; a movable blade having an arcuate notch in the lower edge thereof with a sharp cutting edge defining said notch; the cutting edges of said fixed and movable blades being in opposed relationship to each other and in operable cutting relationship; guide means for guiding the movable blade upwardly and downwardly in cutting relationship to the fixed blade; electrical means for actuating said movable blade, said electrical means comprising a solenoid having a solenoid coil and an armature, means pivotally connecting said movable blade to said armature; yielding means urging the movable blade into an upper position, means limiting movement of said blade in said direction; energization of said solenoid coil being adapted to actuate the armature and hence the movable blade downwardly to effect cutting action in connection with the fixed blade; means limiting the downward movement of said armature and blade; switch means for controlling electrical energy to said solenoid coil, said switch means comprising a micro-switch having a plunger, means for supporting said micro-switch with the plunger facing in the direction of the blade; a switch actuating arm; means pivotally mounting the upper end of said arm with said arm in contact with said plunger so that rearward movement of said arm will close said micro-switch being adapted to normally urge the plunger outwardly; a beak engaging member adjacent the lower end of said arm and directly behind the opening in said fixed blade plate so that a bird's beak will engage said beak engaging means when said beak is passed through said opening; and means for adjusting said beak engaging means toward and away from said opening.

8. In a de-beaker: a fixed blade plate having an opening therein with a sharp cutting edge defining a lower portion of said opening; a movable blade having an arcuate notch in the lower edge thereof with a sharp cutting edge defining said notch; the cutting edges of said fixed and movable blades being in opposed relationship to each other and in operable cutting relationship; guide means for guiding the movable blade upwardly and downwardly in cutting relationship to the fixed blade; electrical means for actuating said movable blade, said electrical means comprising a solenoid having a solenoid coil and an armature, means pivotally connecting said movable blade to said armature; yielding means urging the movable blade into an upper position, means limiting movement of said blade in said direction; energization of said solenoid coil being adapted to actuate the armature and hence the movable blade downwardly to effect cutting action in connection with the fixed blade; means limiting the downward movement of said armature and blade; switch means for controlling electrical energy to said solenoid coil, said switch means comprising a micro-switch having a plunger, means for supporting said micro-switch with the plunger facing in the direction of the blade; a switch actuating arm; means pivotally mounting the upper end of said arm with said arm in contact with said plunger so that rearward movement of said arm will close said micro-switch being adapted to normally urge the plunger outwardly; and a beak engaging member adjacent the lower end of said arm and directly behind the opening in said fixed blade plate so that a bird's beak will engage said beak engaging means when said beak is passed through said opening.

9. In a de-beaker: a fixed blade plate having an opening therein with a sharp cutting edge defining a lower portion of said opening; a movable blade having an arcuate notch in the lower edge thereof with a sharp cutting edge defining said notch; the cutting edges of said fixed and movable blades being in opposed relationship to each other and in operable cutting relationship; electrical means for actuating said movable blade, said electrical means comprising a solenoid having a solenoid coil and an armature, means pivotally connecting said movable blade to said armature; yielding means urging the movable blade in a direction away from the cutting edge of the fixed blade; means limiting movement of said blade in said direction; energization of said solenoid coil actuating the armature and hence the movable blade to effect cutting action; means limiting the movement of said armature and blade in the cutting direction; switch means for controlling electrical energy to said solenoid coil, said switch means comprising a micro-switch; a switch actuating arm; means pivotally mounting the one end of said arm; and a beak engaging member adjacent the free end of said arm and behind the opening in said fixed blade plate so that a bird's beak will engage said beak engaging means when said beak is passed through said opening.

10. In a de-beaker: a fixed blade plate having a sharp cutting edge; a movable blade having a notch in the lower end thereof with a sharp cutting edge, defining said notch the cutting edges of said fixed and movable blades being in opposed relationship to each other; guide means for guiding the movable blade relative to the fixed blade; electrical means for actuating said movable blade, said electrical means comprising a coil and an armature, means pivotally connecting said movable blade to said armature; yielding means urging the movable blade away from the fixed blade; means limiting said movement of said movable blade; energization of said coil being adapted to actuate the armature and hence the movable blade toward the fixed blade cutting edge to effect cutting action; means limiting the said movement of said armature and movable blade; switch means for controlling electrical energy to said coil; and means, including a beak engaging member positioned adjacent to and behind the cutting edges of the blades so that a bird's beak will engage said beak engaging means when said beak is passed through said opening.

11. In a de-beaker: a fixed blade having a sharp cutting edge; a movable blade having a sharp cutting edge, the cutting edges of said blades being operably disposed relative to each other; electrical means pivotally connected to said movable blade and actuating same for cutting action when said electrical means is energized; yielding means urging said movable blade in a direction opposite the direction of cutting movement; means limiting movement of said movable blade to a predetermined distance; switch means for controlling electrical energy to said electrical means; and means, including a movable, switch actuating beak engaging member being positioned a predetermined distance behind said blades and so located relative to the cutting edges thereof that a bird's beak will engage said beak engaging means and move same when said beak is passed between the cutting edges of said blades, said beak engaging member actuating said switch when thus moved.

12. In a de-beaker: mechanism support means comprising an upright plate having a notch which extends upwardly from the lower edge of said plate; a stationary blade member secured to the plate and over said notch, said member having an opening therein with an arcuate, upwardly facing sharp cutting edge at the inner face of said member; a blade guide secured to the back of said blade member; a movable blade slidably disposed in said guide, said movable blade having an arcuate notch in the lower end curve oppositely of the cutting edge of the fixed blade member; and means for actuating said movable blade.

References Cited in the file of this patent

UNITED STATES PATENTS

| | | |
|---|---|---|
| 845,331 | Briede | Feb. 26, 1907 |
| 2,359,569 | Lyon | Oct. 3, 1944 |
| 2,589,347 | Demerath | Mar. 18, 1952 |
| 2,722,219 | Hiester | Nov. 1, 1955 |